(12) United States Patent
Johnson

(10) Patent No.: US 7,809,619 B2
(45) Date of Patent: Oct. 5, 2010

(54) METHODS AND SYSTEMS FOR VALIDATING THE AUTHORITY OF THE HOLDER OF A DIGITAL CERTIFICATE ISSUED BY A CERTIFICATE AUTHORITY

(75) Inventor: Richard C. Johnson, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 615 days.

(21) Appl. No.: 11/019,042

(22) Filed: Dec. 20, 2004

(65) Prior Publication Data

US 2005/0125319 A1 Jun. 9, 2005

Related U.S. Application Data

(62) Division of application No. 10/071,363, filed on Feb. 7, 2002, now Pat. No. 7,152,048.

(51) Int. Cl.
*G06Q 40/00* (2006.01)
(52) U.S. Cl. .......................................... 705/35; 705/44
(58) Field of Classification Search .................. 705/64, 705/65, 35, 38, 74, 1, 75; 235/380; 713/170; 463/42
See application file for complete search history.

(56) References Cited

U.S. PATENT DOCUMENTS

| | | | |
|---|---|---|---|
| 5,329,589 A | 7/1994 | Fraser et al. |
| 5,642,419 A | 6/1997 | Rosen |
| 5,677,955 A | 10/1997 | Doggett et al. |
| 5,903,882 A | 5/1999 | Asay et al. |
| 6,134,550 A | 10/2000 | Van Oorschot et al. |
| 6,301,658 B1 | 10/2001 | Koehler |

(Continued)

FOREIGN PATENT DOCUMENTS

JP 02291043 11/1990

(Continued)

OTHER PUBLICATIONS

Oracle (Oracle ipayment concepts and procedures, Release 11i, Part No. A83641-01, 2000).*

(Continued)

*Primary Examiner*—Ojo O Oyebisi
(74) *Attorney, Agent, or Firm*—Townsend and Townsend and Crew LLP

(57) ABSTRACT

A method for a financial services provider to securely process corporate payment requests includes a step of issuing a primary digital certificate to a primary certificate holder of a corporation. The primary certificate authorizes the primary certificate holder to designate a plurality of holders of secondary digital certificates that are derivative from the primary certificate, each of the primary and plurality of secondary certificates including unique identifying information and/or an indication of authority of the holder of the certificate. Pending corporate payment requests are collected for clearing against the account of the corporation, and a pending payment statement is periodically generated, the statement including the collected pending payment requests. Thereafter, each of the collected pending payment requests is required to be validated by an authenticated primary or secondary certificate holder having the authority to validate the payment requests and only the validated corporate payment requests of the pending payment statement are cleared (paid) against the corporate account.

30 Claims, 5 Drawing Sheets

U.S. PATENT DOCUMENTS

| | | | |
|---|---|---|---|
| 6,321,333 | B1 | 11/2001 | Murray |
| 6,701,303 | B1 | 3/2004 | Dunn et al. |
| 6,978,380 | B1 | 12/2005 | Husain et al. |
| 7,120,609 | B1* | 10/2006 | Kerkdijk ..................... 705/78 |
| 7,133,846 | B1 | 11/2006 | Ginter et al. |
| 7,209,889 | B1 | 4/2007 | Whitfield |
| 2002/0147905 | A1* | 10/2002 | Perlman .................... 713/157 |
| 2003/0028481 | A1 | 2/2003 | Flitcroft et al. |
| 2005/0060584 | A1* | 3/2005 | Ginter et al. ................ 713/201 |

FOREIGN PATENT DOCUMENTS

| | | |
|---|---|---|
| JP | 2000148012 | 5/2000 |
| JP | 2002032700 | 1/2002 |

OTHER PUBLICATIONS

Messmer, Ellen (Network World, ISSN: 0887-7661 Journal Code: NWW, v15n6 pp. 1, 75. Feb. 9, 1998).*

International Search Report mailed Oct. 14, 2003, in corresponding International Application No. PCT/US03/02111, filed Jan. 22, 2003 (4pgs).

International Preliminary Examination Report mailed Apr. 4, 2005, in corresponding International Application No. PCT/US03/02111, filed Jan. 22, 2003 (4pgs).

Office Action mailed Jan. 24, 2005, in parent U.S. Appl. No. 10/071,363, filed Feb. 7, 2002.

Final Office Action mailed Jul. 12, 2005, in parent U.S. Appl. No. 10/071,363, filed Feb. 7, 2002.

C/Net news.com, http://www.news.com/, "AT&T sues eBay, PayPal over patent", Jan. 21, 2004.

Japanese Office Action dated Feb. 20, 2007, in related Japanese Application No. 566811/2003.

Oracle, "Oracle iPayment Concepts and Procedures" Release 11i, Apr. 2000, Part No. A83641-01.

* cited by examiner

FIG. 4A
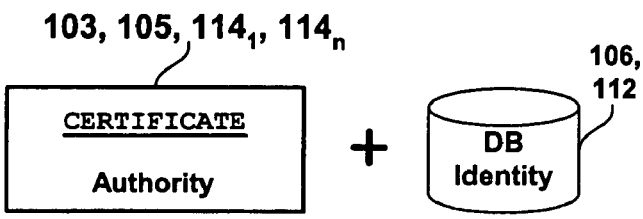
FIG. 4B
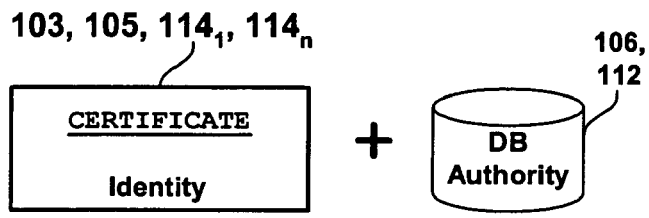
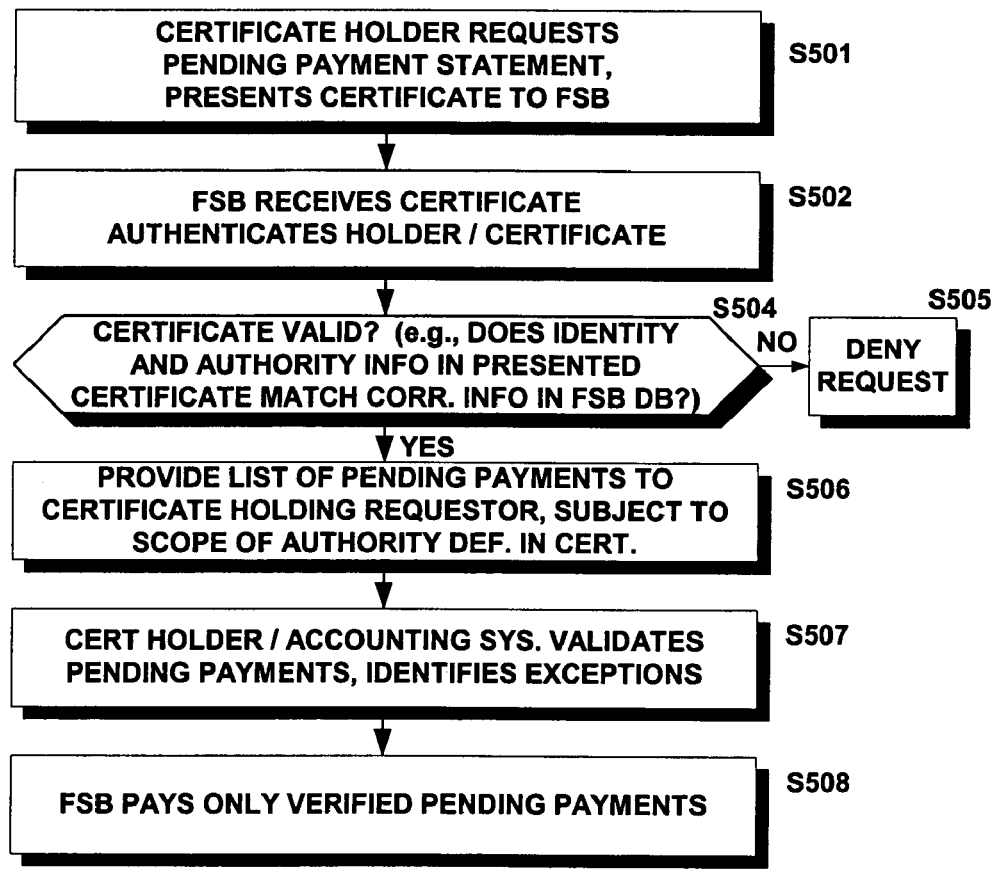
FIG. 5

METHODS AND SYSTEMS FOR VALIDATING THE AUTHORITY OF THE HOLDER OF A DIGITAL CERTIFICATE ISSUED BY A CERTIFICATE AUTHORITY

CROSS REFERENCE TO RELATED APPLICATIONS

This application is a divisional of application Ser. No. 10/071,363, filed Feb. 7, 2002 now U.S. Pat. No. 7,152,048, the benefit of which is hereby claimed under 35 U.S.C. §120.

The subject matter of the present application is related to the subject matter disclosed in co-pending and commonly assigned U.S. patent application Ser. No. 09/272,056, entitled "Methods And Systems For Single Sign-On Authentication In A Multi-Vendor E-Commerce Environment And Directory-Authenticated Bank Drafts" filed on Mar. 18, 1999; Ser. No. 09/405,741, entitled "Methods And Systems For Carrying Out Directory-Authenticated Electronic Transactions Including Contingency Dependent Payments Via Secure Electronic bank Drafts" filed on Sep. 24, 1999 and Ser. No. 09/490,738, entitled "eDropShip: Methods And Systems For Anonymous E-Commerce Shipment" filed on Jan. 24, 2000, the disclosures of which are hereby incorporated herein in their entirety.

BACKGROUND OF THE INVENTION

1. Field of the Invention

The present invention relates to methods and systems for providing security for corporate payments through a corporate bank (hereafter, Financial Service Provider or FSP) to a payee such as corporate partner (hereafter, Trading Partner or TP).

2. Description of the Related Art

Every corporation may be presumed to have a Chief Executive Office (CEO), Chief Financial Officer (CEO) or a person or persons that operate in that capacity. Such a person typically designates employees with authority to approve payments and/or authorize the FSP to make payments to the TP for goods and/or services provided by the TP to the corporation. To prevent fraud or mistake, such payments should be approved before the corporation's account with the FSP is debited. Preferably, the person or mechanism established to approve such pending payments should be authenticated (their identity verified to insure that the person or mechanism is who or what he, she or it purports to be) prior to the payment to the TP being released.

The primary corporate payment instruments are: paper checks, Electronic Funds Transfer (EFT), EXtensible Markup Language (XML) messages, credit cards, and purchase cards. Each payment instrument has its existing set of security models, yet none of them are totally satisfactory. All existing security models focus on given payment instruments, largely to the exclusion of the others. Alternatively, security risks vary widely among these methods of payment. Paper checks have the longest tradition as a payment method, which usually consists of the matching of a signature on the check against a signature on a signature card. Some checks of high value may require two signatures to be valid. However, for efficiency reasons, signatures are not commonly examined by the FSP as they are processed, except perhaps to insure that the correct number of signatures is present. If the account has sufficient funds, the check will usually clear regardless of signature. The corporation, then, must discover any discrepancies during a reconciliation process, applying to the FSP to reverse check and charges as appropriate. This results in contention between the FSP and the corporation, as the FSP tries to shift assumption of the risk of bad checks to the corporation, while the corporation typically believes the FSP should assume this responsibility. This is an ongoing problem for many corporations and their FSPs.

In a typical scenario, the FSP receives checks for clearing against the corporation's account until 2 pm (for example) each day. In addition, the FSP accumulates pending payment requests from servers used by the corporation. Such requests may not have digital signatures. If they do not, the FSP typically has no non-repudiable means of determining the legitimacy of the payment request. The paper checks received for clearing against the corporation's account may or may not be legitimate. FSPs typically no longer inspect signatures and compare them against signature cards unless they have received a specific request to do so. At the end of the business day (such as at 5 pm, for example), the FSP debits the corporation's account for the amounts in the received payment requests and correspondingly credits the accounts of the purported payees. The FSP will then typically print a statement at the end of the month and send it securely to an authorized person at the corporation for reconciliation against the corporation's accounting system.

EFTs are customarily handled by agreement between corporations and their FSPs, with some electronic banking systems permitting EFTs. Some EFTs and corporations rely on security based upon a combination of an ID and a password, with or without private networking (such as a Virtual Private Network or VPN) and Public Key Infrastructure (PKI) certificates. EFT security typically requires a signature on paper to back up whatever other security means have been selected. Moreover, the measures aimed at securing EFTs are usually applicable only to EFT payments.

XML payments are under development by a variety of providers of services and technology. Typically, an XML payment system will include authorization through PKI certificate by a person identified through the certificate. The ancillary procedures, that is, the means by which certificates are generated and distributed, varies widely—in some cases, third party vendors participate in the security arrangements. Most such XML efforts have FSP sponsorship and may be presumed to have very high standards of security. None of the known systems for XML security either integrate with corporate Enterprise Resource Planning (ERP) systems or internal FSP procedures.

Credit cards are discrete instruments designated by an account number and an expiration date, both of which are known to the holder of the card. Unfortunately, these are easily learned by others and credit cards have historically not been regarded has having strong security. Federal law requires FSPs to assume responsibility for unauthorized charges over $50. However, FSPs would like to find others (usually the vendor who accepted the card—the payee) to take responsibility for the unauthorized charge. The usual control is that purchases made with credit cards are subject to predetermined limits. The only security measure usually associated with credit cards is that the merchant will verify by signature/picture on the physical card before submitting the purchase request to the card issuer. However, merchants rarely, in practice, compare the signature on the receipt with that appearing on the card. Moreover, such thin security measures are not typically available for purchases made over the telephone or Internet. Credit card fraud is a major problem in the U.S. and an even greater problem elsewhere. Such fraud affects both business and personal payments.

Purchase Cards (Pcards) are corporate credit cards that have high limits relative to credit cards. Pcards may be physically implemented as plastic cards, but their main function lies in supporting payments for corporate purchases over the facsimile, telephone or the Internet. The security provisions for Pcards vary widely, with ID/password being the highest level and none at all (use of the card number on a paper form) being the lowest.

Corporate use of credit cards and Pcards usually costs the corporation and the TP some fee paid to the FSP. Unlike consumer credit cards, the main risk involves fraud or improper use by unauthorized individuals rather than non-payment by the holder of the card. Even so, corporate losses could be considerable, as could those of the FSP. The TP is in a quandary, since there is no basis other than the means of communication for believing that a card number is valid and is being properly used. Faxed orders with the credit card number on the fax would be an example of security for the TP.

What are needed, therefore, are methods and systems for insuring strong security for all forms of corporate payments. What are also needed are methods and systems for insuring that the individual or mechanism that approves the corporate payments has the authority to approve the payments; that is, has the right to bind the corporate to pay the authorized payments.

SUMMARY OF THE INVENTION

In accordance with the above-described objects and those that will be mentioned and will become apparent below, a method for a financial services provider to securely process corporate payment requests, according to an embodiment of the present invention, may include steps of issuing a primary digital certificate to a primary certificate holder of a corporation, the primary certificate authorizing the primary certificate holder to designate a plurality of holders of secondary digital certificates that are derivative from the primary certificate, each of the primary and plurality of secondary certificates including unique identifying information and/or an indication of authority of the holder of the certificate; collecting pending corporate payment requests for clearing against an account of the corporation; periodically generating a pending payment statement that includes the collected pending payment requests; requiring that each of the collected pending payment requests be validated by an authenticated primary or secondary certificate holder having the authority to validate the payment requests, and clearing only validated corporate payment requests of the pending payment statement against the corporate account.

According to further embodiments, the primary certificate may include both identifying information uniquely identifying an officer of the corporation and the authority of the officer. The primary certificate may include the identifying information uniquely identifying an officer of the corporation and wherein the authority of the officer is stored by the financial services provider. The requiring step may include steps of receiving the primary certificate from the primary certificate holder or one of the secondary certificates from one of the secondary certificate holders; authenticating the identity of the certificate holder from which the certificate was received, and validating the presented certificate. The primary digital certificate may include the authority of an officer (such as a C-Level executive, for example) of the corporation and the identifying information uniquely identifying the officer may be stored by the financial services provider. The indication of authority may include a maximum payment that the holder of the certificate is authorized to validate, the expiration date of the certificate and/or payees for which the certificate holder is authorized to validate payments.

The method may further include the step of receiving a list of validated corporate payment requests from an authenticated certificate holder of the corporation and clearing only those corporate payment requests against the corporate account that are listed in the received list of validated corporate payment requests. The requiring step may include a step of validating the collected pending payment requests of the pending payment statement at least partially programmatically. The requiring step may validate each pending payment requests in the pending payment statement by matching the payment request with a corresponding payment request in the accounting system of the corporation. The pending payment statement generating step may generate the pending payment statement at a regular interval, such as daily and/or weekly, for example.

According to another embodiment thereof, the present invention is a computer system configured to enable a financial services provider to securely process corporate payment requests, including at least one processor; at least one data storage device; a plurality of processes spawned by the at least one processor, the processes including processing logic for issuing a primary certificate to a primary certificate holder of a corporation, the primary certificate authorizing the primary certificate holder to designate a plurality of holders of secondary digital certificates that are derivative from the primary digital certificate, each of the primary and plurality of secondary certificates including unique identifying information and/or an indication of authority of the holder of the certificate; collecting pending corporate payment requests for clearing against an account of the corporation; periodically generating a pending payment statement that includes the collected pending payment requests; requiring that each of the collected pending payment requests be validated by an authenticated primary or secondary certificate holder having the authority to validate the payment requests, and clearing only validated corporate payment requests of the pending payment statement against the corporate account.

The present invention may also be viewed as a machine-readable medium having data stored thereon representing sequences of instructions which, when executed by computing device, causes the computing device to enable a financial services provider to securely process corporate payment requests by performing the steps of: issuing a primary certificate to a primary certificate holder of a corporation, the primary certificate authorizing the primary certificate holder to designate a plurality of holders of secondary digital certificates that are derivative from the primary digital certificate, each of the primary and plurality of secondary certificates including unique identifying information and/or an indication of authority of the holder of the certificate; collecting pending corporate payment requests for clearing against an account of the corporation; periodically generating a pending payment statement that includes the collected pending payment requests; requiring that each of the collected pending payment requests be validated by an authenticated primary or secondary certificate holder having the authority to validate the payment requests, and clearing only validated corporate payment requests of the pending payment statement against the corporate account at the FSP.

The present invention, according to a still further embodiment thereof, is a method for securing payments of a corporation, comprising the steps of receiving a primary certificate from a financial services provider (FSP); assigning the primary certificate to a primary certificate holder of the corporation, the primary certificate authorizing the primary certificate holder to designate a plurality of holders of secondary digital certificates that are derivative from the primary digital certificate, each of the primary and plurality of secondary certificates including unique identifying information and/or an indication of an authority of the holder of the certificate; periodically accessing a pending payment statement generated by the FSP upon presentation of the primary or one of the secondary certificates and successful authentication by the FSP, the pending payment statement including one or more pending payment requests of the corporation collected by the FSP; matching each of the pending corporate payment requests against a record of a corresponding entry in the accounting system of the corporation; validating only those corporate payment requests having corresponding entries in the accounting system, a validation of each collected pending payment request by an authenticated certificate holder being a condition precedent to the payment request clearing the account of the corporation at the FSP.

According to further embodiments of the present invention, access to the accounting system of the corporation is by presentment of the primary certificate or one of the secondary certificates. The periodic accessing step may be carried out every day, for example, or at another regular or selected interval. The periodic accessing step may include a step of logging onto a Web site of the FSP. The periodic accessing step may include a step of receiving and opening an electronic file sent by the FSP, the electronic file including the pending payment statement generated by the FSP. Each certificate holder may be limited to validating only those pending payment requests that are within the scope of the authority indicated in the certificate. The method may further include a step of changing the scope of the authority of a certificate holder upon changing a status of the holder within the corporation (upon promoting, transferring or discharging the certificate holder, for example). Changing the scope of authority of a certificate holder may include a step of revoking the certificate of the holder. A step of issuing a new secondary certificate to the holder of the revoked certificate may then be carried out, the new secondary certificate including an indication of the changed authority. The indication of authority may include a maximum payment that the holder of the certificate is authorized to validate, an expiration date of the certificate and/or payees for which the certificate holder is authorized to validate payments, for example.

The present invention may also be viewed as a computer system configured for securing payments of a corporation, comprising at least one processor; at least one data storage device; a plurality of processes spawned by the at least one processor, the processes including processing logic for: receiving a primary certificate from a financial services provider (FSP); assigning the primary certificate to a primary certificate holder of the corporation, the primary certificate authorizing the primary certificate holder to designate a plurality of holders of secondary digital certificates that are derivative from the primary digital certificate, each of the primary and plurality of secondary certificates including unique identifying information and/or an indication of an authority of the holder of the certificate; periodically accessing a pending payment statement generated by the FSP upon presentation of the primary or one of the secondary certificates and successful authentication by the FSP, the pending payment statement including one or more pending payment request of the corporation collected by the FSP; matching each of the pending corporate payment requests against a record of a corresponding entry in the accounting system of the corporation; validating only those corporate payment requests having corresponding entries in the accounting system, a validation of each collected pending payment request by an authenticated certificate holder being a condition precedent to clearing an account of the corporation at the FSP.

According to another embodiment thereof the present invention is a machine-readable medium having data stored thereon representing sequences of instructions which, when executed by computing device, causes the computing device to secure payments of a corporation by performing the steps of receiving a primary certificate from a financial services provider (FSP); assigning the primary certificate to a primary certificate holder of the corporation, the primary certificate authorizing the primary certificate holder to designate a plurality of holders of secondary digital certificates that are derivative from the primary digital certificate, each of the primary and plurality of secondary certificates including unique identifying information and/or an indication of the authority of the holder of the certificate; periodically accessing a pending payment statement generated by the FSP upon presentation of the primary or one of the secondary certificates and successful authentication by the FSP, the pending payment statement including one or more pending payment request of the corporation collected by the FSP; matching each of the pending corporate payment requests against a record of a corresponding entry in the accounting system of the corporation; validating only those corporate payment requests having corresponding entries in the accounting system, a validation of each collected pending payment request by an authenticated certificate holder being a condition precedent to clearing an account of the corporation at the FSP.

BRIEF DESCRIPTION OF THE DRAWINGS

FIG. 4A is a diagram of a certificate and database combination that may be employed in the method and system for securing corporate payments, according to an embodiment of the present invention.

FIG. 4B is another diagram of a certificate and database combination that may be employed in the method and system for securing corporate payments, according to another embodiment of the present invention.

FIG. 5 is a flowchart of a method of securing corporate payments, according to an embodiment of the present invention.

DESCRIPTION OF THE INVENTION

Herein, the terms "FSP", "financial institution" and "bank" are used interchangeably and shall be understood to include all financial services institutions accepting deposits of cash, negotiable securities, marketable shares/stock into numbered (or otherwise uniquely-identified) accounts and honoring checks, drafts and/or other customer instructions. Such a definition includes (but is not limited to) traditional banks and savings institutions, stockbrokers, online trading concerns, credit unions and any institution or trusted entity that legally identifies with and has some financial relationship with an account holder and that has the ability to honor customer or account holder instructions referring to specific accounts. The applicability of the present invention extends also to such institutions as post offices or other governmental agencies that carry out banking or quasi-banking functions, assuming that such institutions and agencies maintain numbered (or otherwise uniquely identified) accounts and require proof of identity similar to that required at banks; namely, in person signature to set up the numbered account at the institution and agreeing to the terms of service for participation in the system according to the present invention. The Internal Revenue Service (IRS) may be thought of as another example of such a governmental agency.

Figure 1:
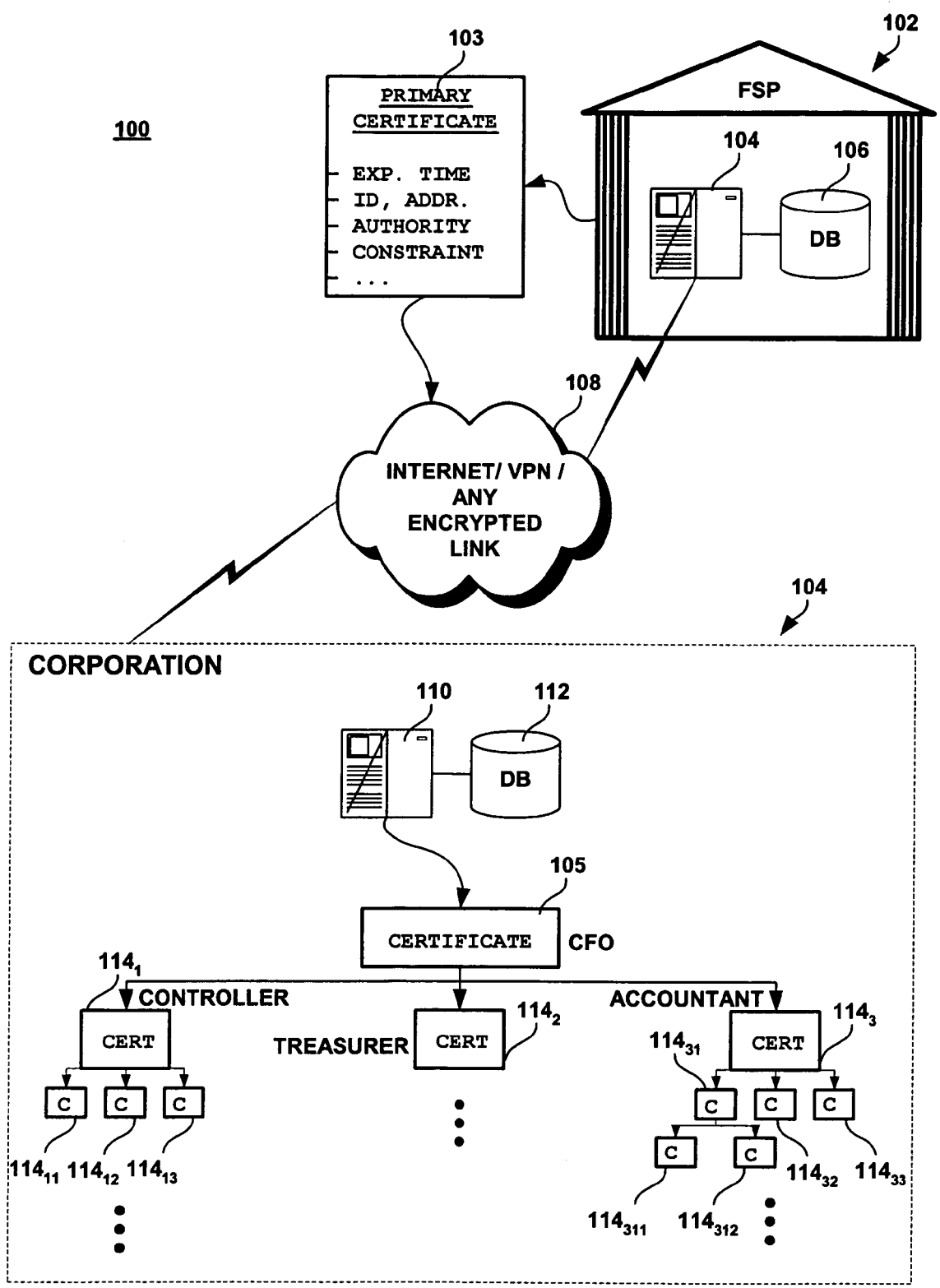
FIG. 1 is a representation of aspects of the system and method for securing corporate payments, according to an embodiment of the present invention.

FIG. 1 is a representation of the system 100 and aspects of the method for securing corporate payments, according to an embodiment of the present invention. As shown therein, reference numeral 102 represents the FSP and reference numeral 104 represents a corporation or other legal entity that maintains one or more accounts with the FSP 102. The FSP 102 and the corporation 104, according to the present invention, exchange information over a network 108. The network 108 may include, for example, the Internet, a Virtual Private Network (VPN) and/or any secure (e.g., encrypted) link or channel. As shown in FIG. 1, the FSP 102 may maintain one or more servers 104 and one or more databases 106. The database 106 may include the personal, business and/or account information of its account holders. Similarly, the FSP 104 may maintain one or more servers 110 coupled to one or more databases 112. The database 112 may store, for example, the corporation's accounting information.

The systems and methods according to the present invention may be referred to as Multiple Electronic Money Payment HighLevel Integrated Security (MEMPHIS). MEMPHIS includes systems and methods for providing a high level of security for all corporate payment, irrespective of the mode of payment (excepting cash). The present MEMPHIS systems and methods require prior agreement between the corporation and its FSP (the FSP at which the corporation maintains funds on deposit in a numbered account or accounts or at which the FSP maintains a letter of credit or other credit arrangement), after which the FSP may offer the corporations the extended security features of the present invention.

Payments are all subject to clearing at the corporation's FSP. That is to say, the corporation requests (through the use of any payment modality such as, for example, check, credit card, purchase card, EFT or XML-based message) that the FSP debit the corporation's account and pay some identified payee an amount of money (or other consideration) stated in the payment request. Such payment requests arrive at the FSP 102 for clearing (payment) against the corporate account. Instead of automatically clearing these payment requests as they arrive (singly or in batch) against the corporate account (s) without further intervention from the corporation or a representative thereof, the present invention calls for the FSP 102 to collect the payment requests in a batch while they are still pending. That is, the FSP 102 intercepts the payment requests before they are cleared against the corporate account (s) and collects them in a batch. Thereafter, the FSP 102 may periodically generate a pending payment statement that includes the collected pending payment requests. The pending payment statement that is generated by the FSP 102 may include all of the pending payment requests that arrived at the FSP 102 since the last pending payment statement was generated. Alternatively, more than one pending payment statement may be generated by the FSP 102, each including selected payment requests that have arrived at the FSP 102 during a specified period of time.

According to an embodiment of the present invention, the FSP 102 requires that each of the payment requests collected in the pending payment statement be validated by the corporation 104 before each payment request is allowed to clear the corporate account. In this manner, the corporation 104 is protected against fraudulent or erroneous payment requests before payments thereon are made and the FSP 102 is protected against claims by the corporation 104 of wrongfully clearing fraudulent or erroneous payment requests. According to the present invention, security is insured by means, among other measures, of digital certificates. For example, the certificates utilized within the context of the present invention may include, for example, Public Key Infrastructure (PKI) that enables an identified and designated representative or representatives of the corporation to securely exchange information over a network (such as network 108) using a combination of a public and a private encryption key.

As shown in FIG. 1, the present invention calls for the FSP 102 to issue a single primary digital certificate 103 to the corporation 104. The primary digital certificate 103 may be issued to a selected and identified primary certificate holder such as, for example, an officer of the corporation. For example, the primary certificate 103 may be issued by the FSP 102 to a C-level officer of the corporation 104, such as the Chief Executive Officer (CEO) or the Chief Financial Officer (CFO) of the corporation 104. The primary digital certificate 103 may include, for example, the expiration date of the primary certificate 103, the identification of the primary certificate holder (including any personal or identifying information such as the holder's address for example), the authority granted to the primary certificate holder and any constraint (s) placed upon the primary certificate holder (such as limits on access in the accounting system, for example). According to the present invention, the authority of the primary certificate holder may be defined in terms of an amount (in dollars, for example) of a payment request that the primary certificate holder is authorized to approve. The authority of the primary certificate holder may be very high or effectively unlimited. As such the primary certificate holder should be a trusted person within the corporation 104, as he or she will have the authority to approve very high payment requests that will bind the corporation and that most likely will be non-repudiable after clearing the corporate account. According to the present invention, the primary certificate 103 authorizes (but does not require) the primary certificate holder to designate a plurality of secondary certificate holders 105, $114_1$-$114_n$. The secondary certificates 105, $114_1$-$114_n$ are derivative from the primary certificate 103 and each includes unique identifying information uniquely identifying the secondary certificate holder to whom the secondary certificate 105, $114_1$-$114_n$ is issued and/or the authority of the secondary certificate holder. At least the secondary certificates 105, $114_1$-$114_n$ may be generated by software provided the corporation by the FSP 102, whether such certificate-generating software runs from the corporation's server 112 and/or the FSP's server 106. According to an embodiment of the present invention, the FSP 102 is the Certificate Authority and the corporation 104 is the Derivative Certificate Authority, controlling the issuance, assignment and distribution of secondary certificates 105, $114_1$-$114_n$ among its employees (and/or other trusted entities) as it delegates authority and access privileges with regard to its financial systems and records.

Whereas the primary certificate holder may be granted the highest access privileges (all corporate accounts, potentially unlimited approval authority), the secondary certificate holders may be granted selectively more limited access privileges. Indeed, the rights associated with the secondary certificates 105, 114$_i$-114$_n$ may roughly follow the hierarchical organization structure of the corporation, for example. For instance, the CFO may be granted very high access privileges and payment request approval limits, whereas those who report to the CFO (accountants, bookkeepers, accounts payable personnel) may be granted comparatively lesser access privileges and/or approval limits.

Periodically, the FSP requires that each of the payment requests collected in the pending payment statement be validated by the corporation before each payment request is allowed to clear the corporate account. That is, by agreement between the FSP 102 and the corporation 104, the FSP 102 holds up payment on each payment requests until and if the payment request is eventually validated (e.g., payment authorized) by an authenticated primary or secondary certificate holder having the authority to validate the payment request. Indeed, according to an embodiment of the present invention, there may be two conditions for the FSP 102 to release payment on a payment request by the corporation 106 to an identified payee. The first such condition may be a proper authentication of the certificate holder and the second such condition may be that the secondary certificate 105, 114$_i$-114$_n$ defines an authority level that is sufficient to validate the payment request. Such authority may include, for example, a maximum monetary amount that the secondary certificate holder is authorized to approve or may define those payees for whom the secondary certificate holder is authorized to validate payment requests, among other possibilities.

The authentication measures to authenticate the primary or any of the certificate holders may take several forms. The FSP 102 may authenticate the primary certificate 103 and the corporation 104 may authenticate the secondary certificates 105, 114$_i$-114$_n$. That is, the FSP 102 and/or the corporation 104 may insure keep an on-going record of each issued, expired, revoked or changed certificate, as well as the access privileges and authority defines therein. Thereafter, the FSP 102 and/or the corporation may insure that the certificate presented upon validation of the payment requests of the pending payment statement are valid, current and uncorrupted. Any other security measures may be implemented by agreement between the FSP 102 and the corporation 104. For example, the corporation's server 110 and the FSP's server 104 may each exchange certificates (server-to-server certificates) with one another during the communication session therebetween. The server-to-server certificates used in communication between the servers 104, 110 are preferably different from the primary and secondary certificates 103, 105, 114$_i$-114$_n$ used by the corporate employees to validate pending payment requests. Both, however, have the effect of raising the security of communications between the FSP 102 and the corporation 104 to a very high level that is uniform across all payment modalities. Additional measures may be deployed to increase security such as, for example, the collection and analysis of biometric data (fingerprints, voice prints, retinal scans and the like, for example) of certificate holders seeking to validate pending payment requests. Such biometric data may be acquired and compared with previously collected data stored in the corporation's database 112 and/or the FSP's database 106. For example, the corporation 104 may require that the secondary certificate holder give his or her thumbprint and pass a first authentication in this manner before being allowed to present his or her secondary certificate 105, 114$_i$-114$_n$ to validate payment requests within the scope of his or her authority, as defined in his or her secondary certificate. Other security measures may be implemented unilaterally by the FSP 102 and/or the corporation 104, or bilaterally, by mutual agreement between the FSP 102 and the corporation 104.

Figure 2:
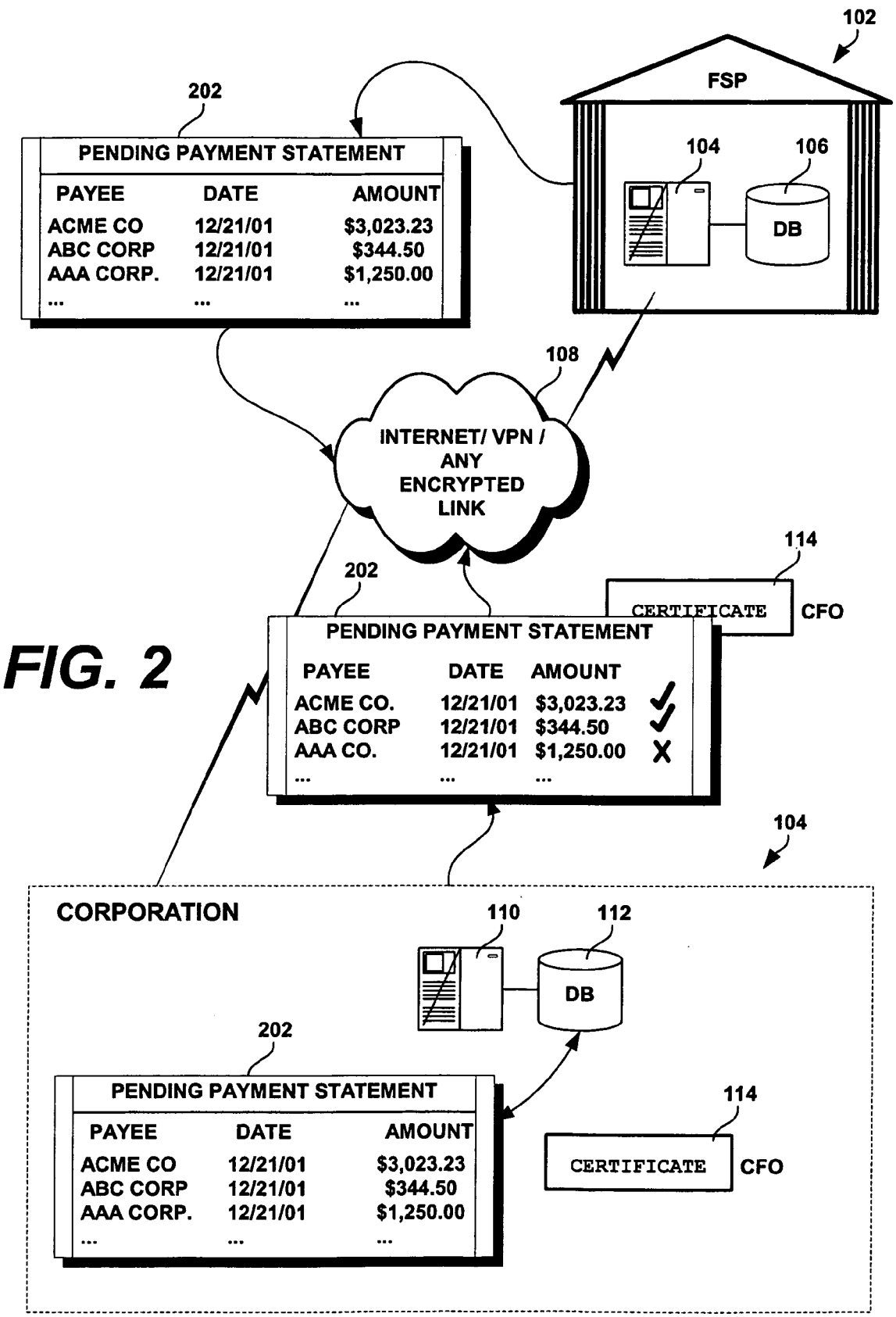
FIG. 2 is a representation of further aspects of the system and method for securing corporate payment, according to an embodiment of the present invention.

FIG. 2 is a representation of further aspects of the system and method for securing corporate payment, according to an embodiment of the present invention. As shown therein, an embodiment of the present invention calls for the FSP 102 to periodically generate a pending payment statement, an illustrative example of which is shown at reference numeral 202. The pending payment statement 202 may be generated at regular intervals such as, for example, every day at 2:00 pm. In that case, the pending payment statement includes all payment requests made by the corporation 104 and received by the FSP 102 since the previous pending payment statement 202 was generated and/or those pending payment requests that have not yet been validated by a properly authenticated primary or secondary certificate holder of the corporation 104. The generated pending payment statement 202 may then be sent to the FSP 104 over the network 108, which may be or include the Internet, a VPN negotiated between the corporation 104 and the FSP 102 or any encrypted link such as, for example, a Secure Socket Link (SSL). Other means of securing the communication channel between the FSP 102 and the corporation will occur to those of skill in this art. Once received by the server 110, the constituent payment requests of the pending payment statement 202 may then be authenticated by one or more of the primary and secondary certificate holders of the corporation having the proper level of authority. In the illustrative example of FIG. 2, the CFO presents her secondary certificate 114, is authenticated by the corporation 104 and/or the FSP 102 and is authorized to validate (or not) each or selected ones of the constituent payment requests of the pending payment statement 202. According to the present invention, the validation of the pending payment requests may be made at least partially programmatically; that is, by matching each of the payment requests of the pending payment statement against a matching entry in the corporation's accounting system. Optionally, all or some of the pending payment requests may be validated by visual inspection by an authenticated human primary or secondary certificate holder. Several levels of validation may be necessary. In the case of FIG. 2, the payment requests to Acme co. and ABS Corp. have been validated by the CFO as a secondary certificate holder (or programmatically matched against a corresponding record in one or more accounting tables accessed by the corporation's accounting system in the database 112) and reviewed by the CFO. The payment requests to Acme Co. and ABC Corp., therefore, have check marks next to them, to indicate validation of the request by a properly authenticated certificate holder. In the example shown in FIG. 2, however, the payment request to AAA Corp. has been flagged as potentially problematic and has not been validated. This may be because the corporation 104 does not have any record of having issued a payment request to AAA Corp, or some other aspect of the payment request does not match the corporation's accounting records. For example, the payment request to AAA Corp. may appear in the pending payment statement 202 with an incorrect date, an incorrect amount or may have been generated by a person not authorized to generate a payment request for this vendor. Alternatively still payments to this vendor may be held up (prevented from clearing the corporate account) for other reasons including, for example, that AAA Corp. delivered non-conforming goods to the corporation 104, is in arrears with the corporation 104 or a host of other potential reasons. For example, the payment request may be entirely fraudulent, and may have been secretly generated by an employee of the corporation 104. In prior art systems, such a fraudulent payment request may have been allowed to clear the corporation's account at the FSP 102, leaving the corporation 104 to dispute the payment with the FSP 102 or to absorb the loss itself, without further recourse (at least against the FSP). The interruption of the payment process prior to clearing, according to the present invention, signifies that fraudulent or erroneous payment requests are not paid before they are discovered. Further test(s) of the validity and/or authenticity of any payment request may be agreed upon by the corporation 104 and the FSP 102. The FSP may then be notified of any suspicious payment instruments and can hold off paying (clearing) such suspicious payment requests until a resolution of the matter is arrived at between the FSP 102 and the corporation 104.

Figure 3:
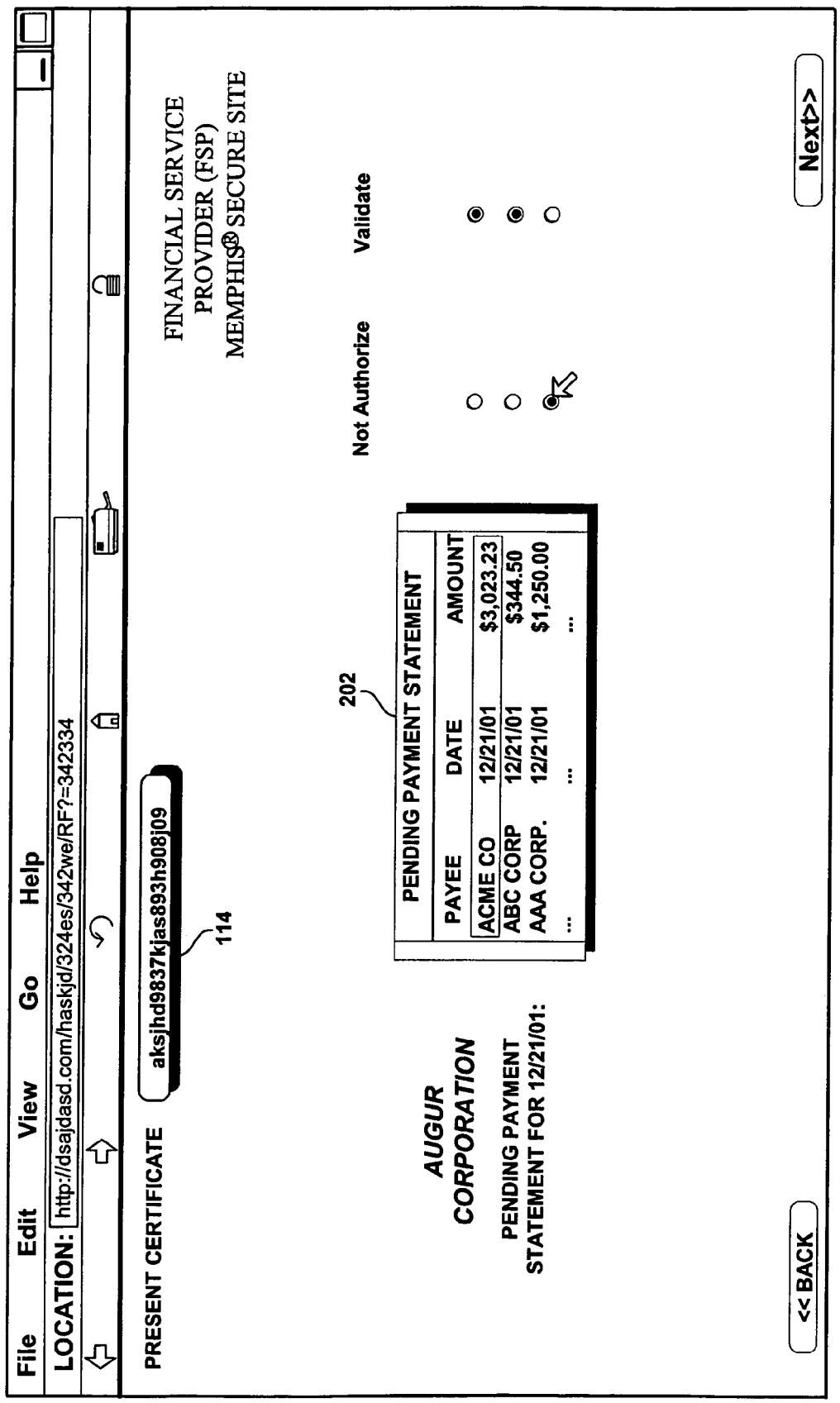
FIG. 3 shows a Web browser showing aspects of the present system and method, according to another embodiment thereof.

FIG. 3 shows a Web browser showing aspects of the present system and method, according to another embodiment thereof. As shown therein, instead of the FSP sending the pending payment statement 202 over the network 108 to the corporation 104, the primary or one of the secondary certificate holders may log onto a secure Web site 300 maintained by the FSP 102. Upon presenting the primary certificate or one of the secondary certificates (certificate 114 being shown in FIG. 3), and being properly authenticated by the FSP 102, the certificate holder may be presented with the pending payment statement 202. The pending payment statement 202 shown to the certificate holder may include only those pending payment requests that fall within the scope of the authority and/or access rights defined in the presented certificate. In this manner, each certificate holder may be presented only with those pending payment requests that he or she has been granted the authority to validate. By means of a mouse click or other user interaction means, the logged on certificate holder may visually inspect the pending payment requests and/or cause the same to be programmatically validated, again subject to the scope of authority defined in the presented certificate. Thereafter, the FSP 102 may clear the validated pending payment requests (pay them from the corporation's funds on deposit and/or draw down a line of credit or other instrument, by agreement between the FSP 102 and the corporation 104). According to an embodiment of the present invention, in response to the presentation of the certificate, a single sign on programmed login may be carried out. Upon logging in, the certificate holder would be automatically given access to all databases and applications authorized by the scope of the authority defined in his her certificate. All desired databases and applications may be selected from a single login page.

FIG. 4A is a diagram of a certificate and database combination that may be employed in the method and system for securing corporate payments, according to an embodiment of the present invention. FIG. 4A shows that the identity of the certificate holder need not be stored in the certificate, but may be stored in the FSP's database 106 and/or in the corporation's database 112, leaving the primary certificate 103 and/or the secondary certificates 105, 114$_1$-114$_n$ defined in the certificate. Alternatively, the authority of the certificate holder may be stored in one or both of the databases 106, 112 while identifying information uniquely identifying the certificate holder may be stored in the primary certificate 103 and/or the secondary certificates 105, 114$_1$-114$_n$, as shown in FIG. 4B. Upon being presented with a certificate, the corporation 104 and/or the FSP 102 may match the information stored in the presented certificate with corresponding information stored in the database 106 and/or 112 to authenticate the certificate holder. Similarly, the certificate holder's database access rights may also be defined and stored in the certificate and/or one or more of the databases 106, 112.

FIG. 5 is a flowchart of a method of securing corporate payments, according to an embodiment thereof. As shown therein the method begins at S501 with a certificate holder requesting access to the pending payment statement (such as shown at 202 in FIGS. 2 and 3) and presents his or her certificate to the FSP 102. This request may be carried out upon logging on the FSP's secure Web site established for this purpose, as shown in FIG. 3. At S502, the FSP 102 receives the certificate, and at S504 determines whether to authenticate the holder and/or the certificate For example, the FSP 102 may determine whether the certificate is valid (i.e., the certificate is a known, valid and still current certificate) by, for example, matching some or all of the information defined therein with corresponding information stored in the FSP's database 106. If the certificate is not valid, the certificate holder's request to access the pending payment statement may be denied, as shown at S505. If, however, the certificate holder is authenticated, the pending payment statement that includes a list of pending payment requests within the scope of the authority of the certificate holder is provided, as shown at S506. Thereafter, the certificate holder and/or the corporation's accounting system validates (or declines to validate) the constituent pending payments of the pending payment statement, identifying exceptions (being those payment requests that have not been validated and which the FSP 102 should not pay), as shown at S507. Lastly, the FSP 102 pays only those payment requests of the pending payment statement that were validated, as called for by step S508. Alternatively, the FSP may send an encrypted file including the pending payment statement to the corporation over the network 108. Thereafter, those with the proper authority to do so may validate the constituent payment requests thereof and so inform the FSP, by sending the FSP 102 an encrypted file noting the validated payment requests as well as the exceptions (those payment requests that are not validated).

The request for the pending payment statement from the FSP 102 or the sending thereof to the corporation 104 may take place at regular (and preferably rather short) intervals, such as, for example, once every business day, although other frequencies may readily be defined. In this manner, reconciliation may be spread throughout the month, as any time period may be used to collect the pending payment requests and validate them. No further (e.g., end of month) reconciliation need be done once this validation is carried out regularly. The present invention is believed to enable corporations to achieve more precise control of corporate payments, and enables the corporation to eliminate opportunities for payment fraud and a higher level of precision in the corporate distribution of authority, privileges and access rights.

Hardware Description

Figure 6:
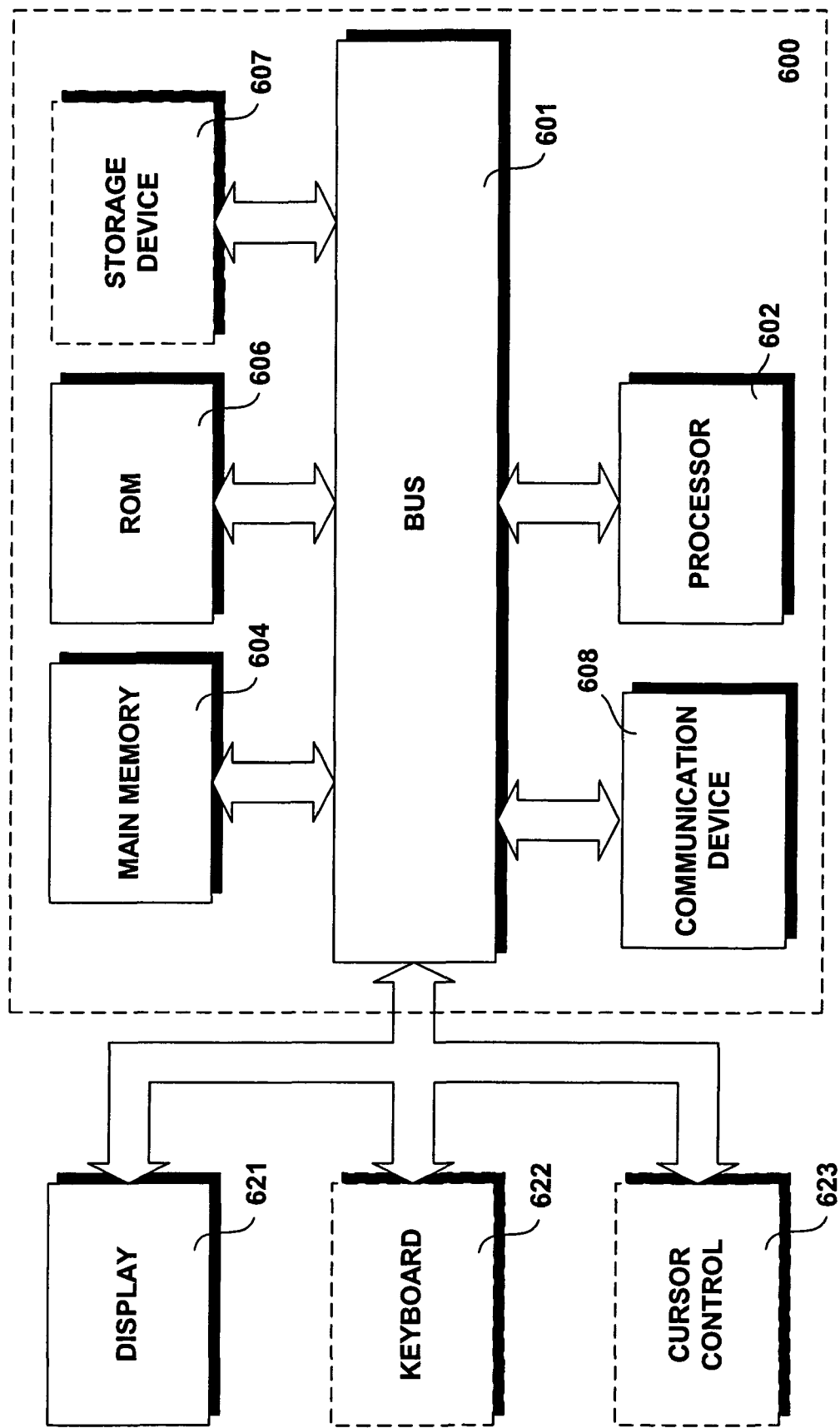
FIG. 6 is a diagram of a computer with which the present invention may be practiced.

FIG. 6 illustrates a block diagram of a computing device 600 with which an embodiment of the present invention may be implemented. Computing device 600 includes a bus 601 or other communication mechanism for communicating information, and a processor 602 coupled with bus 601 for processing information. Computing device 600 further comprises a random access memory (RAM) or other dynamic storage device 604 (referred to as main memory), coupled to bus 601 for storing information and instructions to be executed by processor 602. Main memory 604 also may be used for storing temporary variables or other intermediate information during execution of instructions by processor 602. Computing device 600 may also include a read only memory (ROM) and/or other static storage device 606 coupled to bus 601 for storing static information and instructions for processor 602. A data storage device 607, such as a magnetic disk or optical disk, may be coupled to bus 601 for storing information and instructions. A communication device 608, such as a modem or network (such as Ethernet, for example) card may also be coupled to the bus 601 to provide access to a network, such as the Internet, for example.

The computing device 600 may also be coupled via bus 601 to a display device 621, such as a cathode ray tube (CRT), for displaying information to a computer user. An alphanumeric input device 622, including alphanumeric and other keys, is typically coupled to bus 601 for communicating information and command selections to processor 602. Another type of user input device may be the user's own voice or cursor control 623, such as a mouse, a trackball, or cursor direction keys for communicating direction information and command selections to processor 602 and for controlling cursor movement on display 621.

The present invention is related to the use of computing device 600 for securing corporate payments as described herein. According to one embodiment, the processing may be carried out by one or more computing devices 600 in response to processor(s) 602 executing sequences of instructions contained in memory 604. Such instructions may be read into memory 604 from another computer-readable medium, such as data storage device 607 and/or from a remotely located server. Execution of the sequences of instructions contained in memory 604 causes processor(s) 602 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Modifications may occur to those of skill in this art. Thus, the present invention to be limited only by the claims as set forth below.

What is claimed is:

1. A computer-implemented method for securing payments of a corporation, comprising the steps of:
   receiving a primary certificate, over a computer network, from a financial services provider (FSP);
   assigning, using a computer, the primary certificate to a primary certificate holder of the corporation, the primary certificate authorizing the primary certificate holder to designate a plurality of holders of secondary digital certificates that are derivative from the primary digital certificate, each of the primary and plurality of secondary certificates including unique identifying information and an indication of an authority of the holder of the certificate, the indication of authority including a maximum payment that the holder of the certificate is authorized to validate and an identification of payees for whom the certificate holder is authorized to validate payments;
   periodically accessing, over the computer network, a pending payment statement generated by the FSP upon presentation of the primary or one of the secondary certificates and successful authentication by the FSP, the pending payment statement including at least one pending payment request of the corporation collected by the FSP;
   matching, using the computer, each of the at least one pending corporate payment requests against a record of a corresponding entry in an accounting system of the corporation;
   validating, using a computer, only those corporate payment requests having corresponding entries in the accounting system, that are within the maximum payment and for the identified payees included in the presented and authenticated certificate, a validation of each collected pending payment request by an authenticated certificate holder being a condition precedent to the payment request clearing an account of the corporation at the FSP.

2. The computer-implemented method of claim 1, wherein access to the accounting system of the corporation is by presentment of the primary certificate or one of the secondary certificates.

3. The computer-implemented method of claim 1, wherein the periodic accessing step is carried out every day.

4. The computer-implemented method of claim 1, wherein the periodic accessing step includes a step of logging onto a Web site of the FSP.

5. The computer-implemented method of claim 1, wherein the periodic accessing step includes a step of receiving and opening, using the computer, an electronic file sent by the FSP, the electronic file including the pending payment statement generated by the FSP.

6. The computer-implemented method of claim 1, wherein each certificate holder is limited to validating only those pending payment requests that are within a scope of the authority indicated in the certificate.

7. The computer-implemented method of claim 1, further including a step of changing, using the computer, a scope of the authority of a certificate holder upon changing a status of the holder within the corporation.

8. The computer-implemented method of claim 7, wherein changing the scope of authority of a certificate holder includes a step of revoking the certificate of the holder.

9. The computer-implemented method of claim 8, further including a step of issuing, using the computer, a new secondary certificate to the holder of the revoked certificate, the new secondary certificate including an indication of the changed authority.

10. The computer-implemented method of claim 1, wherein the indication of authority includes an expiration date of the certificate of the certificate holder.

11. A computer system configured for securing payments of a corporation, comprising:
   at least one processor;
   at least one data storage device;
   a plurality of processes spawned by said at least one processor, the processes including processing logic for:
   receiving a primary certificate from a financial services provider (FSP);
   assigning the primary certificate to a primary certificate holder of the corporation, the primary certificate authorizing the primary certificate holder to designate a plurality of holders of secondary digital certificates that are derivative from the primary digital certificate, each of the primary and plurality of secondary certificates including unique identifying information and an indication of an authority of the holder of the certificate, the indication of authority including of a maximum payment that the holder of the certificate is authorized to validate and an identification of payees for whom the certificate holder is authorized to validate payments;
   periodically accessing a pending payment statement generated by the FSP upon presentation of the primary or one of the secondary certificates and successful authentication by the FSP, the pending payment statement including at least one pending payment request of the corporation collected by the FSP;

matching each of the at least one pending corporate payment requests against a record of a corresponding entry in an accounting system of the corporation;

validating only those corporate payment requests having corresponding entries in the accounting system, that are within the maximum payment and for the identified payees included in the presented and authenticated certificate, a validation of each collected pending payment request by an authenticated certificate holder being a condition precedent to clearing an account of the corporation at the FSP.

12. The computer system of claim 11, wherein access to the accounting system of the corporation is by presentment of the primary certificate or one of the secondary certificates.

13. The computer system of claim 11, wherein the periodic accessing step is carried out every day.

14. The computer system of claim 11, wherein the periodic accessing step includes a step of logging onto a Web site of the FSP.

15. The computer system of claim 11, wherein the periodic accessing step includes a step of receiving and opening an electronic file sent by the FSP, the electronic file including the pending payment statement generated by the FSP.

16. The computer system of claim 11, wherein each certificate holder is limited to validating only those pending payment requests that are within a scope of the authority indicated in the certificate.

17. The computer system of claim 11, further including a step of changing a scope of the authority of a certificate holder upon changing a status of the holder within the corporation.

18. The computer system of claim 17, wherein changing the scope of authority of a certificate holder includes a step of revoking the certificate of the holder.

19. The computer system of claim 18, further including a step of issuing a new secondary certificate to the holder of the revoked certificate, the new secondary certificate including an indication of the changed authority, 20. The computer system of claim 11, wherein the indication of authority includes an expiration date of the certificate of the certificate holder.

21. A machine-readable medium having data stored thereon representing sequences of instructions which, when executed by computing device, causes said computing device to secure payments of a corporation by performing the steps of:

receiving a primary certificate from a financial services provider (FSP);

assigning the primary certificate to a primary certificate holder of the corporation, the primary certificate authorizing the primary certificate holder to designate a plurality of holders of secondary digital certificates that are derivative from the primary digital certificate, each of the primary and plurality of secondary certificates including unique identifying information and an indication of an authority of the holder of the certificate, the indication of authority including a maximum payment that the holder of the certificate is authorized to validate and an identification of payees for whom the certificate holder is authorized to validate payments;

periodically accessing a pending payment statement generated by the FSP upon presentation of the primary or one of the secondary certificates and successful authentication by the FSP, the pending payment statement including at least one pending payment request of the corporation collected by the FSP;

matching each of the at least one pending corporate payment requests against a record of a corresponding entry in an accounting system of the corporation;

validating only those corporate payment requests having corresponding entries in the accounting system, that are within the maximum payment and for the identified payees included in the presented and authenticated certificate, a validation of each collected pending payment request by an authenticated certificate holder being a condition precedent to clearing an account of the corporation at the FSP.

22. The medium of claim 21, wherein access to the accounting system of the corporation is by presentment of the primary certificate or one of the secondary certificates.

23. The medium of claim 21, wherein the periodic accessing step is carried out every day.

24. The medium of claim 21, wherein the periodic accessing step includes a step of logging onto a Web site of the FSP.

25. The medium of claim 21, wherein the periodic accessing step includes a step of receiving and opening an electronic file sent by the FSP, the electronic file including the pending payment statement generated by the FSP.

26. The medium of claim 21, wherein each certificate holder is limited to validating only those pending payment requests that are within a scope of the authority indicated in the certificate.

27. The medium of claim 21, further including a step of changing a scope of the authority of a certificate holder upon changing a status of the holder within the corporation.

28. The medium of claim 27, wherein changing the scope of authority of a certificate holder includes a step of revoking the certificate of the holder.

29. The medium of claim 28, further including a step of issuing a new secondary certificate to the holder of the revoked certificate, the new secondary certificate including an indication of the changed authority.

30. The medium of claim 21, wherein the indication of authority includes an expiration date of the certificate of the certificate holder.

* * * * *

UNITED STATES PATENT AND TRADEMARK OFFICE
CERTIFICATE OF CORRECTION

| | | |
|---|---|---|
| PATENT NO. | : 7,809,619 B2 | Page 1 of 1 |
| APPLICATION NO. | : 11/019042 | |
| DATED | : October 5, 2010 | |
| INVENTOR(S) | : Richard C. Johnson | |

It is certified that error appears in the above-identified patent and that said Letters Patent is hereby corrected as shown below:

In column 14, line 56, in claim 11, delete "infonmation" and insert -- information --, therefor.

In column 14, line 37, in claim 19, delete "," and insert -- . --, therefor.

Signed and Sealed this

Seventeenth Day of May, 2011

David J. Kappos
*Director of the United States Patent and Trademark Office*